(12) United States Patent
Wittmann

(10) Patent No.: US 9,879,801 B2
(45) Date of Patent: Jan. 30, 2018

(54) CONDUIT STAKE

(71) Applicant: Gulf Sea Products, LLC, Ft. Myers, FL (US)

(72) Inventor: Timothy P. Wittmann, St. Louis, MO (US)

( * ) Notice: Subject to any disclaimer, the term of this patent is extended or adjusted under 35 U.S.C. 154(b) by 0 days.

(21) Appl. No.: 15/400,497

(22) Filed: Jan. 6, 2017

(65) Prior Publication Data

US 2017/0284566 A1   Oct. 5, 2017

Related U.S. Application Data

(60) Provisional application No. 62/315,132, filed on Mar. 30, 2016.

(51) Int. Cl.
*F16L 1/11* (2006.01)
*F16L 3/04* (2006.01)

(52) U.S. Cl.
CPC ..................... *F16L 3/04* (2013.01)

(58) Field of Classification Search
CPC ......... B15B 15/062; E04H 15/62; A45F 3/44; F16L 1/11; F21V 21/0824
USPC ............... 248/545, 74.5, 76, 85, 87, 508
See application file for complete search history.

(56) References Cited

U.S. PATENT DOCUMENTS

| | | | | |
|---|---|---|---|---|
| 3,941,342 A * | 3/1976 | Bradshaw | ............. | B05B 1/20 239/276 |
| 5,881,495 A * | 3/1999 | Clark | ............. | A01G 9/12 135/118 |
| 6,135,623 A * | 10/2000 | Lin | ............. | F21S 8/081 362/353 |
| 6,349,514 B1 * | 2/2002 | Adams | ............. | A01G 9/122 135/118 |
| 6,527,246 B1 * | 3/2003 | Stinnett | ............. | F16L 1/06 248/530 |
| 7,004,403 B2 * | 2/2006 | Thayer | ............. | A01G 27/00 239/271 |
| 7,097,117 B2 * | 8/2006 | Zur | ............. | B05B 15/062 239/275 |
| 7,472,874 B2 * | 1/2009 | Gross | ............. | E04H 12/2215 135/118 |
| 8,113,473 B2 * | 2/2012 | Bradley | ............. | E04H 12/2253 174/158 F |
| 8,292,452 B2 * | 10/2012 | Ko | ............. | F21S 8/081 362/183 |
| 8,505,859 B2 * | 8/2013 | Leung | ............. | A01G 1/08 248/156 |

(Continued)

*Primary Examiner* — Bradley Duckworth
(74) *Attorney, Agent, or Firm* — Charles McCloskey

(57) ABSTRACT

A conduit stake has three slender ribs, a cap upon the ribs, a head upon the cap, a slot in the head, and a hook extending outwardly from the head opposite the slot. The three ribs have a common point and extend upwardly therefrom in a cross section similar to the letter Y up to the cap. The first rib of the three has at least three notches oriented to grasp soil and gravel particles so that the stake resists withdrawal. The head has a thickness, or height, above the cap at least three times the thickness of the cap. The slot has a shape and orientation to admit a ferrous tab plate for later detection and location of the invention when concealed by gravel, other aggregate, or soil. Outwardly from the head, the hook extends a sufficient reach to admit a conduit and then turns downwardly.

5 Claims, 2 Drawing Sheets

(56) References Cited

U.S. PATENT DOCUMENTS

| | | | |
|---|---|---|---|
| 2006/0180729 A1* | 8/2006 | Yang | E04H 12/2215 |
| | | | 248/508 |
| 2007/0091585 A1* | 4/2007 | Hedman | B05B 17/08 |
| | | | 362/96 |
| 2010/0242829 A1* | 9/2010 | Macey | F16L 1/11 |
| | | | 116/201 |
| 2012/0049036 A1* | 3/2012 | Colesanti | E01F 9/61 |
| | | | 248/508 |
| 2015/0096260 A1* | 4/2015 | Intagliata | E04H 12/347 |
| | | | 52/741.14 |

* cited by examiner

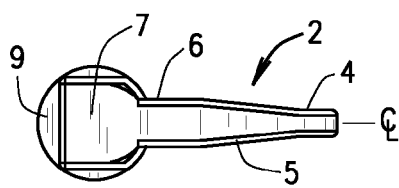
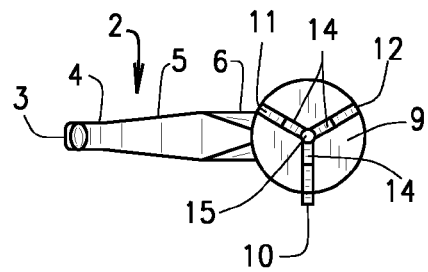
FIG. 4
FIG. 5
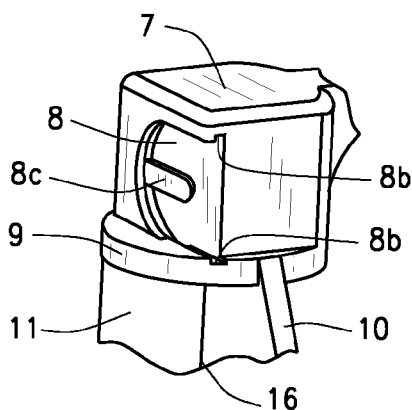
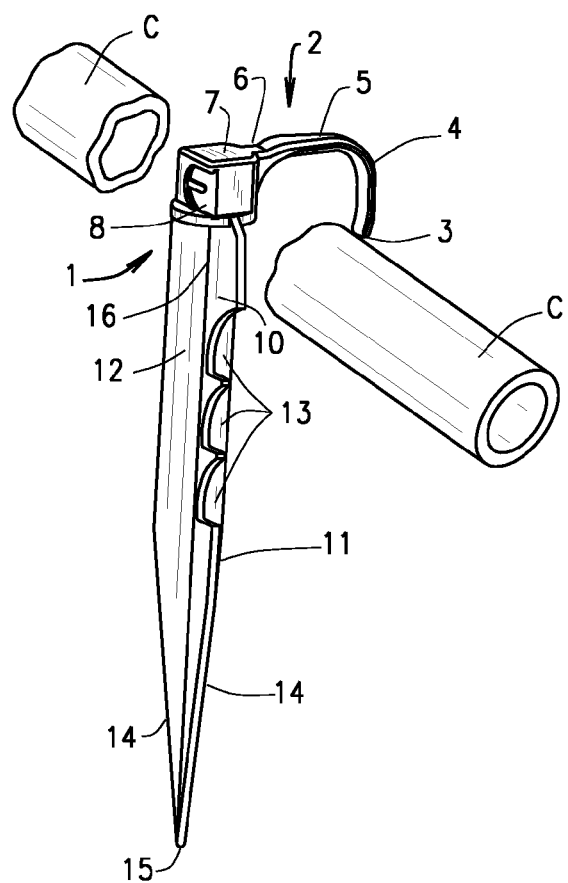
FIG. 6
FIG. 7

CONDUIT STAKE

CROSS-REFERENCE TO RELATED APPLICATION

This non-provisional application claims priority to provisional application No. 62/315,132 filed on Mar. 30, 2016, all of which are owned by the same inventor.

BACKGROUND OF THE INVENTION

The present invention relates generally to stakes and, more particularly to a notched stake with a hook.

Construction projects begin at the ground level. A foundation rises from below the ground level and brings utilities upwardly. Other utilities follow the ground level for a construction project or for an addition to an existing facility or landscape. Utilities come in many kinds: electrical, water, natural gas, propane, internet service, computer networking, and others. Utility service generally travels through linear vessels called pipe and conduit. Pipe often contains a liquid or gaseous substance delivered from a utility's storage location to a destination for consumption. Conduit often contains a cable where the conduit serves as armor or structure for the cable.

Upon new construction or upon a landscape, workers may deploy conduit along a desired path established by the construction plans and specifications. The desired path meets the architect's intent, the engineer's intent, and meets the applicable code provisions of the appropriate enforcing authority. Workers often place the conduit upon the ground to visualize its location and compare it to the plans and specifications. Workers may then adjust the conduit position such as for rocks or roadways.

Conduit placed upon the ground remains exposed to the various hazards at that location. Conduit may move from wind, animals, vandals, errant footfalls of workers, equipment, and vehicles. Keeping a conduit in place upon the ground has challenged many a foreman and project superintendent.

DESCRIPTION OF THE PRIOR ART

Workers have secured conduit to a ground surface using various methods. Boxes, rocks, and other deadweight items may temporarily hold down a conduit. However, such items often become "borrowed" from time to time for the next urgent, unplanned use. Workers have placed inverted metal V like and U like shaped wickets upon conduit. These wickets have a generally wire like form bent into a suitable letter shape. The wickets then have two legs inserted into the ground flanking the conduit and a base coming to rest across the conduit. However, wire wickets have every so quietly eased out of the ground surface. Wire wickets have a tendency to bend during installation and may pinch a conduit. Wire wickets, sometimes called bails, also have embedment upon both sides of a conduit which may prove impractical adjacent to a building, foundation, rock formation, and the like.

In a related area, many tents utilize stakes for their temporary securement to the ground during a campout. The stakes have a compact, elongated form for backpack transport and to fit within loops at the corners of a tent floor. A stake often has a tight hook or smaller tab that provides a gripping point for a fly line, tent rope, or other rope around a campsite. A stake may have a cylindrical form, rectangular cross section, vanes in a T like cross section, and the like along with a pointed tip. Stakes for tents may be made from wood, polymer, and metal alloy. A stake often has an earth tone coloration and small diameter thus leading to a stake or two remaining behind from a campout or two. Full embedment of a stake, with its head beneath the ground surface, has occurred from time to time. That leads to stakes being unseen by departing campers and then being left behind.

SUMMARY OF THE INVENTION

The present invention is directed to a conduit stake that has three slender ribs, a cap upon the ribs, a head upon the cap, a slot in the head, and a hook extending outwardly from the head opposite the slot. The three ribs have a common point and extend upwardly therefrom in a cross section similar to the letter Y up to the cap. The head has a thickness, or height, above the cap at least three times the thickness of the cap. The slot has a shape and orientation to admit a metallic plate for later detection of the invention when concealed by gravel, other aggregate, or soil. Outwardly from the head, the hook extends a sufficient reach to admit a conduit and then turns downwardly, that is, towards the point, and partially wraps around the conduit.

There has thus been outlined, rather broadly, the more important features of the invention in order that the detailed description thereof that follows may be better understood and that the present contribution to the art may be better appreciated. The ribs of the invention have a Y like shaped cross section, one rib has notches upon it for embedment into gravel, the notched rib is ninety degrees from the hook, the ribs taper partially along their length, and additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a conduit stake that retains conduit placed within it.

Another object is to provide such a conduit stake that remains embedded into gravel under ordinary use and misuse.

Another object is to provide such a conduit stake that assists in its detection when concealed by gravel.

Another object is to provide such a conduit stake that has a low cost of manufacturing so the purchasing contractors, homeowners, tradesmen, and installers can readily buy the conduit stake through supply houses, catalogs, and select stores.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 4 is a top view of the present invention;

FIG. 5 is a bottom view of the present invention;

FIG. 6 is a detailed perspective view of the head of the present invention;

FIG. 7 is a perspective view of the present invention in use.

The same reference numerals refer to the same parts throughout the various figures.

DESCRIPTION OF THE PREFERRED EMBODIMENT

The present invention overcomes the prior art limitations by providing a conduit stake for improving the retention of conduit on or beneath a ground surface and for increasing the resistance to removal of the stake axially upward from a ground surface. Though this description refers to a ground surface typically at a dry construction site, the invention may see use in the beds of ponds, lakes, creeks, streams, and other waterways, swamps, beaches, banks, and other locations where water and land meet.

Figure 1:
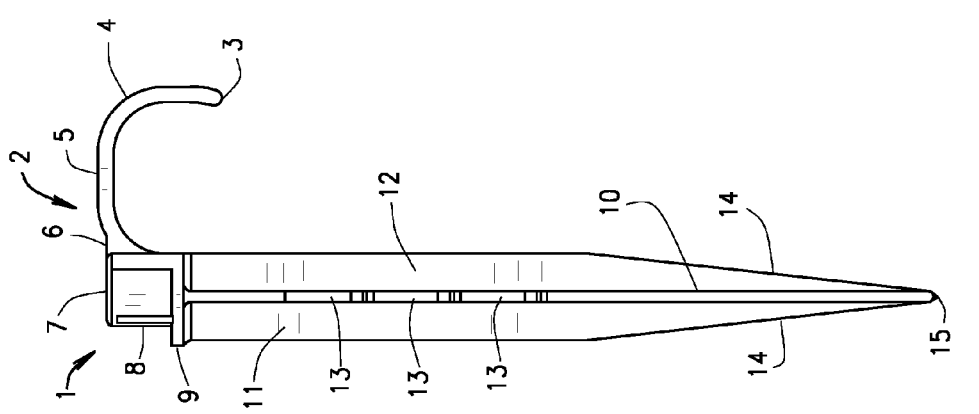
FIG. 1 is a side view of the present invention.

Turning to FIG. 1, the conduit stake of the present invention appears as at 1 in a generally elongated slender form. The invention 1 has a hook 2 with a tip 3 upon a bight 4 extending upwardly and curving from the tip as shown. The bight travels through a ninety degree bend to a flat portion as at 5 that merges with a shoulder 6. The shoulder has a greater thickness and width than the remainder of the hook. The shoulder merges into a head 7 of a rectangular, nearly cube like shape. The head has a width greater than that of the shoulder. Opposite the shoulder, the head has a slot 8 here shown on end. As shown the hook, particularly the flat portion, extends slightly above the head and the tip has its location below the head.

The head merges with a cap 9 generally beneath the head, that is, opposite where the shoulder 6 first merges with the head. The cap has a thin round shape here shown on edge. The diameter of the cap exceeds the width of the head. The tip 3 of the hook 2 has a position below a plane defined by the cap, that is, away from the head 7. The tip 3 also has an inwardly curving form. In an alternate embodiment, the tip also has a tapering, slightly elongated form. Beneath the cap descend three slender, elongated ribs: a first rib 10, a second rib 11, and a third rib 12. In this figure, the first rib 10 extends out of the plane of the figure towards the reader and shows its edge. The second rib 11 extends to the left of the first rib in the figure, while the third rib 12 extends opposite the second rib, that is, to the right. The first rib has an orientation generally perpendicular to the hook so that a worker knows upon placing the hook over conduit, the first rib appears to the right. The first rib's orientation also resists lifting of the stake axially upward upon application of a force transverse applied to conduit secured by the invention. The first rib has a width, radially, that extends outwardly from the cap 9. The first rib bevels inwardly over a short distance to transition from the full width of the first rib to the cap as at 10a. This bevel as at 10a is opposite the tapering 14 shown in FIG. 2. The first rib then has a plurality of notches 13 placed along its length and more clearly shown in FIG. 2. The notches define the first rib as noticeably different from the second rib and the third rib. For each rib, it has its width that is perpendicular to its length. The second rib 11 and the third rib 12 extend outwardly from the first rib typically upon a one hundred twenty degree angle. This orientation establishes a Y like shape cross section as later shown in FIG. 5. The second rib and the third rib have a width, generally measured radially, less than that of the first rib.

Spaced away and below the cap, the first rib, the second rib, and the third rib descend for a distance at a constant width, excepting the notches of the first rib. Approximately slightly below half of the length of the conduit stake, the first rib, the second rib, and the third rib taper, as at 14, in their width and thus attain a point centered below the cap as at 15. The point is a narrow, generally rounded, conical shape and inserts into a ground surface first for the invention during its usage.

During usage, a worker places the point 15 near a conduit, rotates the invention 1 so that the hook 2 extends over the conduit, and then strikes a hammer upon the head 7 to embed the invention into gravel or other ground surface. The invention has a slender, compact form to assist with storing many of the stakes such as in a delivery box, a tool box, or a pouch upon a work belt.

Figure 2:
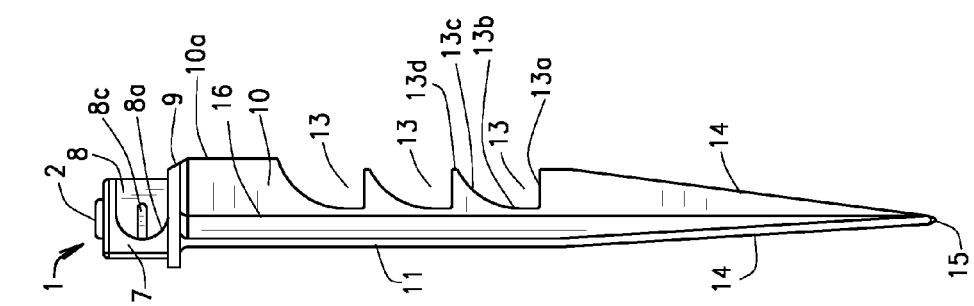
FIG. 2 is a side view ninety degrees clockwise from FIG. 1 of the present invention.

Rotating the conduit stake as at 1, FIG. 2 shows another side view of the stake though ninety degrees into the plane of the figure compared to FIG. 1. Where FIG. 1 shows the first rib and its notches on edge, FIG. 2 shows the first rib 10 and its notches 13 fully. FIG. 2 displays the first rib 10 to the right of the figure and has the second rib 11 extending at an obtuse angle from the first rib out of the plane of this figure. The second rib has an approximate 120 degree angle to the first rib so that the ribs attain a Y like shape. The second rib joins to the first rib along a first merge 16. The first merge appears as a line defined by the intersection of the first rib and the second rib and extends from the cap 10 to the point 15. From the point 15, the first rib 10, the second rib 11, and the third rib (not shown) extend upwardly and outwardly through their tapered portions shown as at 14. The first rib interrupts its taper before the taper concludes for the other two ribs. The interruption of the first rib taper comes from the first of three notches 13. In an alternate embodiment, the first rib has four notches.

The first rib has the notches 13 spaced at a regular interval along its length. The first notch has a location before the taper 14 stops and the last notch, here the third notch, or uppermost notch, has a location spaced beneath the cap that accounts for a possible elevation of the head and thus, the stake, above the ground surface during a surface installation of conduit. Each of the notches has an inverted partially conic shape. A notch has its wide portion towards the point and then the notch narrows in width towards the cap, as the narrow portion, where width denotes a distance outwardly from the first merge.

The wide portion truncates the shown conic shape so that the notch has an inverted, truncated, partially conic shape. The notch has a flat section, as at 13a, at its wide portion, that is, perpendicular to the length of the stake, a tangential section, as at 13b, upwardly from the flat section at the first merge, a curved section, as at 13c, upwardly and inwardly from the tangential section, and its narrow section, as at 13d, shown in this figure. In the preferred embodiment, the notch has its tangential and curved sections upon a constant radius of curvature. In an alternate embodiment, the notch has a partial parabolic shape for its tangential and curved sections. The notches, the three notches shown, cooperate to engage soil particles up to gravel aggregate size so that the invention 1 resists withdrawal from a ground surface. The Applicant identifies test data that showed the invention with its notches had fourteen pounds more hold strength than a plain rib without notches.

The first rib and the second rib continue upwardly from the tapered section 14 and the notches 13 and approach the cap. The first rib and the second rib flare outwardly and merge to a lower surface of the cap. In doing so, the first rib and the second rib have a maximum width that of the radius of the cap. The cap 10 has its round shape as before though it appears in an edge view in this figure. Opposite the first rib and the second rib, the head 7 joins to the cap 1. In this figure, the head has the hook 2 extending into the plate of the figure and thus not shown but for a small portion of the hook from its flat portion. The head has its slot 8 here shown in its full shape. The slot has an exterior wall with a partially circular elongated opening as at 8*a*. The slot receives a metal tab, not shown, of a thickness to fit within the slot, particularly its keyway, or initial opening, previously shown in FIG. 1 and as later shown in FIG. 6. The partially circular elongated opening allows a worker to press upon a metal tab to ease its removal from the slot. The elongated opening also has a rib 8*c* extending inwardly from the curved portion of the opening and generally parallel to the length of the opening, that is, the plane defined by the cap 9. A worker places a metal tab into the slot to assist in later detecting, or locating, the stake 1 following its covering by gravel or other soil or becoming otherwise concealed. The slot retains the tab in the stake so that a detection device, not shown, may find a buried conduit stake.

Figure 3:
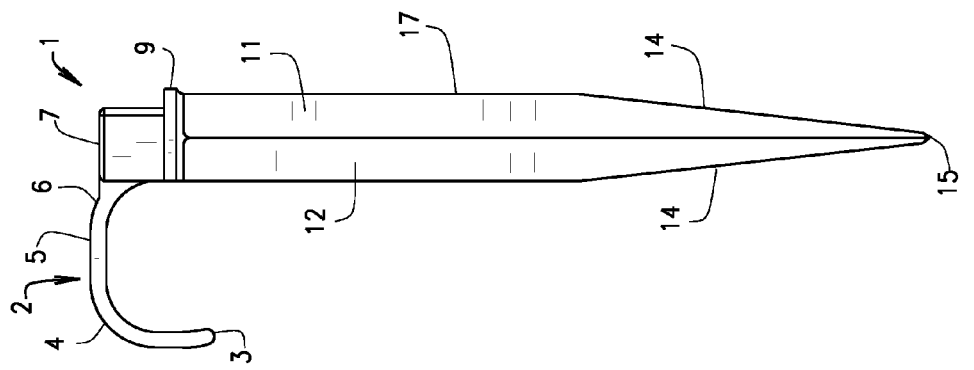
FIG. 3 is a side view opposite FIG. 1 of the present invention.

Rotating the conduit stake as at 1, FIG. 3 shows another side view of the stake though opposite that of FIG. 1 and ninety degrees from that view shown in FIG. 2. Where FIG. 1 showed the first rib and its notches on edge, FIG. 3 shows the third rib 12 and the second rib 11 fully while concealing the first rib and its notches 13. FIG. 3 displays the second rib 11 to the right of the figure and has the third rib 12 extending at an obtuse angle from the second rib. The third rib also has an approximate 120 degree angle to the second rib so that the three ribs attain a Y like shape. The third rib joins to the second rib along a second merge 17. The second merge appears as a line defined by the intersection of the second rib and the third rib and extends from the cap 10 to the point 15. The second merge is generally parallel to the first merge. From the point 15, the second rib 11, the third rib 12, and the first rib (not shown) extend upwardly and outwardly through their tapered portions shown as at 14. The second rib and the third rib have continuous tapers for a select distance typically less than half of the length of the ribs. The second rib, the third rib, and the second merge continue upwardly from the tapered section 14 and approach the cap where the two ribs flare outwardly and merge to the lower surface of the cap. In doing so, the third rib has a maximum width that of the radius of the cap just as the first rib and the second rib. The round cap has its previously described shape but it appears in an edge view, that is, like a rectangle, in this figure.

Opposite the second rib and the third rib, the head 7 joins to the cap 1. In this figure, the head has the hook 2 extending to the left, that is, opposite of FIG. 1. The hook has its tip 3, bight 4, and flat portion 5 as before. The flat portion merges into the shoulder 6 and the shoulder merges into the head 7 above the cap 10 and third rib 12. The shoulder is opposite the second rib 11 in this figure.

Turning the head 7 towards the reader, FIG. 4 shows a top view of the invention 1 with the head to left and the hook 2 to the right, related to that of FIG. 1. The head 7 extends out of the plane of the figure from the cap 10 towards the reader. The head has a somewhat rectangular shaped cross section in this view. The head has one side defining an apparent chordal shape above the cap, that is, to the left of the head. The head, opposite the chordal shape, has the shoulder 6 from which extends the hook 2 that then turns into the plane of the figure with its bight 4. The bight has a cross section narrower than the flat portion of the hook, a cross section of the flat portion that widens towards the shoulder, and a shoulder that has a constant width as shown in this figure. The cap conceals the three ribs in this figure and thus the ribs are not shown.

FIG. 5 does show the three ribs, 10, 11, 12, as it is opposite that of FIG. 4. FIG. 5 has the point 15 generally centered beneath the cap 9, that is, in the foreground of this figure. From the point 15, the three ribs extend radially outwardly along their tapers 14 and into the plane of the figure. The three ribs, first rib 10, second rib 11, and third rib 12, attain a Y like shaped cross section as shown. Similar to the dial and hands of a clock, the first rib 10 attains a 6 o'clock orientation as shown, that is, downwardly in the figure. The first rib is generally perpendicular to the hook 2. The second rib 11 extends radially outwardly from the point and attains a 10 o'clock position, that is, upwardly from the first rib and towards the hook for the upper left portion of the Y like shaped cross section. The third rib 12 also extends radially outwardly from the point and attains a 2 o'clock position, that is, upwardly from the first rib and away from the hook for the upper right portion of the Y like shaped cross section shown.

Outwardly from the first rib and the second rib and outwardly from the cap 9, the hook 2 extends radially. The hook is shown extending to the left in this figure, that is, perpendicular to the first rib. The shoulder 6 extends outwardly from the cap into the flat portion as at 5 and then into the bight 4. The bight curls out of the plane of the figure to show the tip 3 as closest to the reader. The tip has a somewhat rounded shape.

FIG. 6 then shows an enlarged view of the head 7 of the invention 1. The head extends upwardly from the cap 9 with the ribs beneath it, here showing the first rib 10 and the second rib 11 and the first merge 16. The head has its somewhat cube like shape and shows the slot 8 towards the left of the figure. The slot has a slender rectangular shape generally parallel to the first rib with a two spaced apart recessed keyways shown as at 8*b* towards the top and the bottom of the head. The keyways provide a slightly greater height than the remainder of the slot as shown so that the slot retains a metal tab, not shown, placed in the keyways during usage of the invention when embedded. In an alternate embodiment, the keyways are mutually parallel and spaced apart. Outwardly from the keyways 8*b*, the slot has a rectangular shape here shown extending similarly into the invention as in first web, that is, towards the second rib 11. As it nears the second rib, the slot has a rounding of its shape along with the keyway. The rounding assists a user's thumb when extracting a metal tab from the slot. Opposite the slot, the head has a truncated portion of the shoulder 6 shown. In an alternate embodiment, the head includes an aperture that assists with cooling during manufacturing and later with placement of the invention upon a peg hook for retail sale.

And, FIG. 7 provides a perspective view of the invention engaging a piece of conduit shown as at C. The invention has its hook 2 extending generally over the conduit C so that the hook is generally perpendicular to the conduit. The tip 3 is to one side of the conduit and the head 7 is to the opposite side of the conduit with the slot oriented outwardly. The head extends from the cap 9 as previously described. Beneath the cap, the first rib 10, the second rib 11, and the third rib 12 descend with their constant depth portions to their tapered portions as at 14. The first rib has its notches here shown towards the right of and slightly outwardly from the plane of the figure. As described and shown before, the notches have their narrow portions oriented towards the cap and the wide flat portion oriented towards the point 15.

From the aforementioned description, a conduit stake has been described. The conduit stake is uniquely capable of grasping a conduit and holding it adjacent or within a surface and of engaging soil or other aggregate to resist withdrawal of an installed conduit stake. Further, the conduit stake may also have notches, tapering, a slot, and other related features compatible with the structure and purpose of the invention as shown and described. The conduit stake and its various components may be manufactured from many materials, including but not limited to, vinyl, polymers, such as nylon, polypropylene, polyvinyl chloride, high density polyethylene, polypropylene, ferrous and non-ferrous metal foils, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A conduit stake, comprising:
   a head and a hook, said hook extending laterally from said head;
   a cap joined to said head and spaced opposite and beneath said hook;
   a first rib, a second rib joining to said first rib, and a third rib joining to said second rib; said first rib, said second rib, and said third rib joining to said cap opposite said head, and said first rib, said second rib, and said third rib descending from said cap to a common point;
   said first rib having a plurality of notches therein, each of said notches narrowing towards said cap;
   wherein said conduit stake is adapted to grasp a conduit for embedment;
   said head having a slot therein, said slot having two spaced apart keyways wherein said keyways and said slot cooperate to receive a ferrous tab to assist in locating said conduit stake when concealed.

2. The conduit stake of claim 1 further comprising said slot having a rib centered therein, said rib extending generally parallel to said cap.

3. A conduit stake, comprising:
   a common point;
   a first rib, a second rib, and a third rib mutually extending from said common point, said second rib joining to said first rib, and said third rib joining to said second rib;
   a cap joining to said first rib, said second rib, and said third rib opposite said common point;
   a head joining to said cap opposite said first rib, said second rib, and said third rib;
   a hook extending laterally from said head;
   said first rib having a plurality of notches therein, each of said notches narrowing towards said cap;
   wherein said conduit stake is adapted to grasp a conduit for embedment;
   said head having a nearly rectangular shape;
   said head having a slot therein, said slot having a rib centered therein, said rib extending generally parallel to said cap, said slot having two spaced apart keyways wherein said keyways and said slot cooperate to receive a ferrous tab to assist in locating said conduit stake when concealed; and,
   said hook having a tip upon a bight, said bight extending upwardly and curving from said tip through a ninety degree bend to a flat portion merging with a shoulder, said shoulder having a greater thickness and width than the remainder of said hook.

4. A conduit stake, comprising:
   a head and a hook extending laterally from said head;
   a cap joined to said head and spaced opposite and beneath said hook;
   a first rib, a second rib joining to said first rib, and a third rib joining to said second rib; said first rib, said second rib, and said third rib joining to said cap opposite said head, and said first rib, said second rib, and said third rib descending from said cap to a common point;

said first rib having a slender, planar, elongated form and a plurality of notches therein, each of said notches narrowing towards said cap and each of said notches having an inverted, truncated, partially conic shape, said shape having a wide portion oriented towards said point and a narrow portion oriented towards said head;

said first rib having an orientation generally perpendicular to said hook;

said second rib having a slender, planar, elongated form;

said third rib having a slender, planar, elongated form;

said first rib, said second rib, and said third rib each having a width and a length wherein a width is perpendicular to a length, and each rib tapering in width along part of its length commencing at said common point;

said first rib having its width greater than that of said second rib and of said third rib, wherein said first rib, said second rib, and said third rib form a generally Y shaped cross section upwardly from said common point;

said head having a slot therein, said slot having a rib centered therein and extending generally parallel to said cap, two mutually parallel and spaced apart keyways wherein said keyways and said slot cooperate to receive a ferrous tab to assist in locating said conduit stake when concealed by a ground surface.

5. The conduit stake of claim 4 wherein said first rib has three notches therein.

* * * * *